United States Patent [19]

Vanderslice et al.

[11] Patent Number: 5,242,278
[45] Date of Patent: Sep. 7, 1993

[54] POWER GENERATOR AIR COMPRESSOR

[75] Inventors: William M. Vanderslice, Grand Beach, Mich.; James Cosgrove, Michigan City, Ind.

[73] Assignee: Vanair Manufacturing, Inc., New Buffalo, Mich.

[21] Appl. No.: 774,974

[22] Filed: Oct. 11, 1991

[51] Int. Cl.$^5$ .................................................. F04B 35/00
[52] U.S. Cl. ...................................... 417/364; 417/313
[58] Field of Search .................................. 417/364, 313

[56] References Cited

U.S. PATENT DOCUMENTS

| | | | |
|---|---|---|---|
| 2,512,125 | 6/1950 | Whited | 417/364 |
| 2,660,865 | 12/1953 | Durant | 62/196.1 |
| 4,095,922 | 6/1978 | Farr | 417/313 |

*Primary Examiner*—Richard A. Bertsch
*Assistant Examiner*—Charles G. Freay

[57] ABSTRACT

An improvement in vehicle power take-off equipment is disclosed wherein a generator is affixed to the rear of the housing of a rotary air compressor of the type that is driven from a vehicle power take-off to an input shaft at its front end. The generator's housing is attached to the rear end of the air compressor's housing and the generator includes an armature mounted for rotation in the generator's housing. A rotary shaft extension projects from the rear of the air compressor. The armature receives the extension shaft and is coupled thereto by a friction fit and a threaded stud therebetween so that the armature turns with the extension shaft. The extension shaft is coupled for operation by the input shaft of the compressor so that both compressor and generator are directly operated by the input shaft of the compressor.

3 Claims, 4 Drawing Sheets

POWER GENERATOR AIR COMPRESSOR

FIELD OF THE INVENTION

This invention relates to an air compressor power generator combination and will have special but not limited application to air compressors and power generators, which are used in utility and service vehicles and which can operate off the power take-off of the vehicle.

SUMMARY OF THE INVENTION

A variety of utility vehicles have a need for a self contained power generator and air compressor. Utility vehicles and emergency vehicles contain a variety of electrical and pneumatic systems and needs. These systems require a strong independent power and air supply system.

Mounting an independent air compressor or power generator in a utility vehicle is not uncommon. In the conventional utility vehicle, separate compressors and generators are powered by a power take-off from the engine drive. The power generator and compressor are independently mounted in various locations underneath the vehicle frame. The remote locations require the power from the engine drive to be transmitted by drive shafts or belts separately to both the compressor and generator. The separation of the generator and compressor units from the power take-off contributes to a cluttered and mechanically inefficient and complex vehicle undercarriage.

In this invention the generator and compressor are an integrated unit. A shaft extension serves as an output shaft of the compressor and connects inside the fan and armature of the generator. The compressor/generator unit, in one environment, mounts directly onto a gearbox which is drive connected to a power source such as the engine drive of the vehicle. The power take-off shaft of the gearbox connects and drives the input shaft of the compressor. The direct connection of the gearbox to the compressor and generator allows both accessories to simultaneously operate off the vehicle's engine supply while eliminating any additional shaft or belt drive assembly to the compressor and generator units. The compressor/generator unit may also be driven by a separate power drive such as a hydraulic motor or, in a stand-alone non-vehicle use, a gasoline engine. The in-line construction of the generator, compressor and gearbox also maximizes the efficiency of the usable undercarriage space of the vehicle.

The invention, together with further advantages and features thereof, may best be understood by reference to the following description taken in connection with the accompanying drawings, in the several figures of which like reference numerals identify like elements.

BRIEF DESCRIPTION OF THE DRAWINGS

A preferred embodiment of the invention has been chosen for purposes of illustration wherein.

DESCRIPTION OF THE PREFERRED EMBODIMENT

The preferred embodiment herein described is not intended to be exhaustive or to limit the invention to the precise form disclosed. It is chosen and described to explain the principles, application and practical use of the invention to thereby enable others skilled in the art to utilize the invention.

Figure 1:
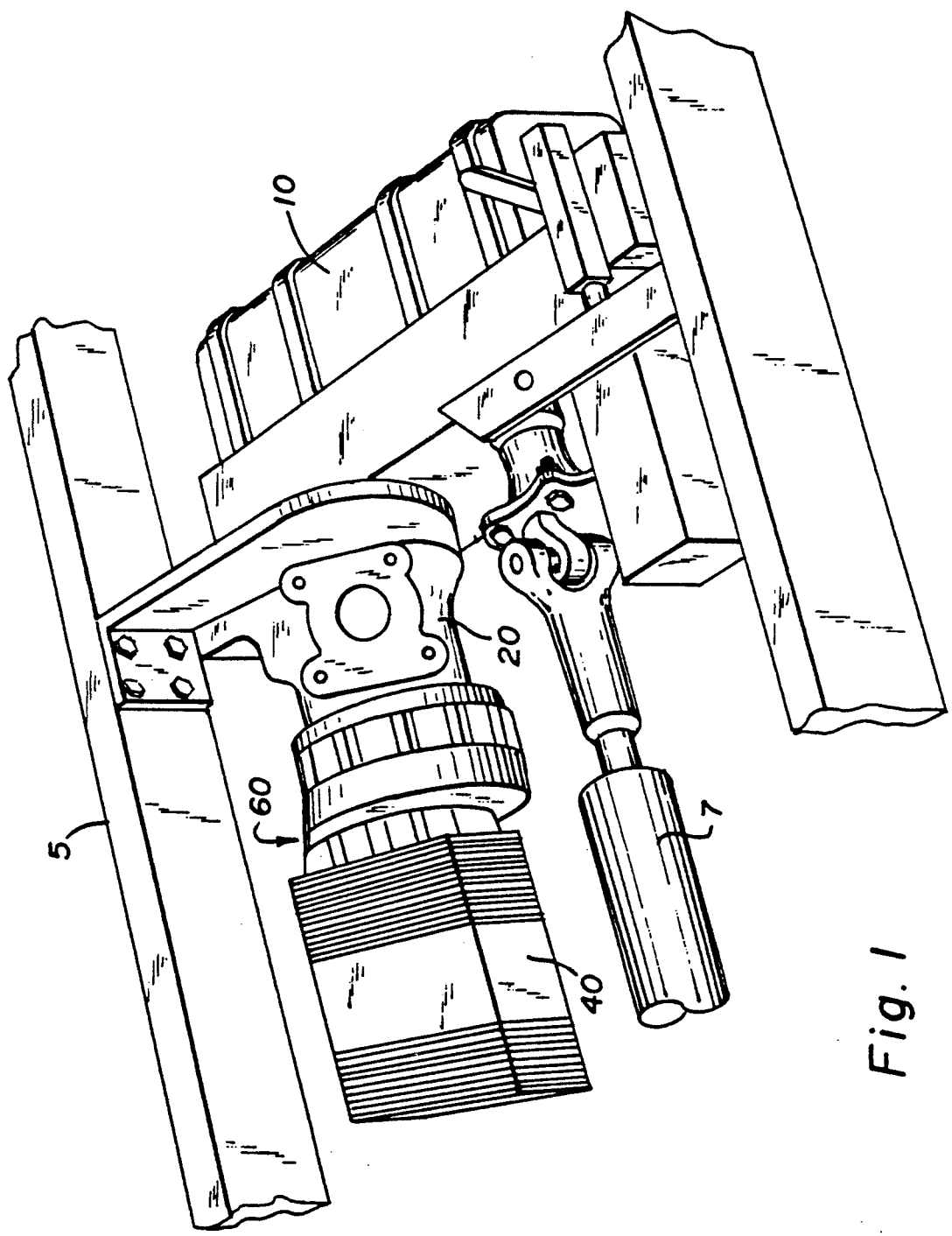
FIG. 1 is a perspective view of the compressor/generator combination mounted to the shaft gearbox of the vehicle.
Figure 2:
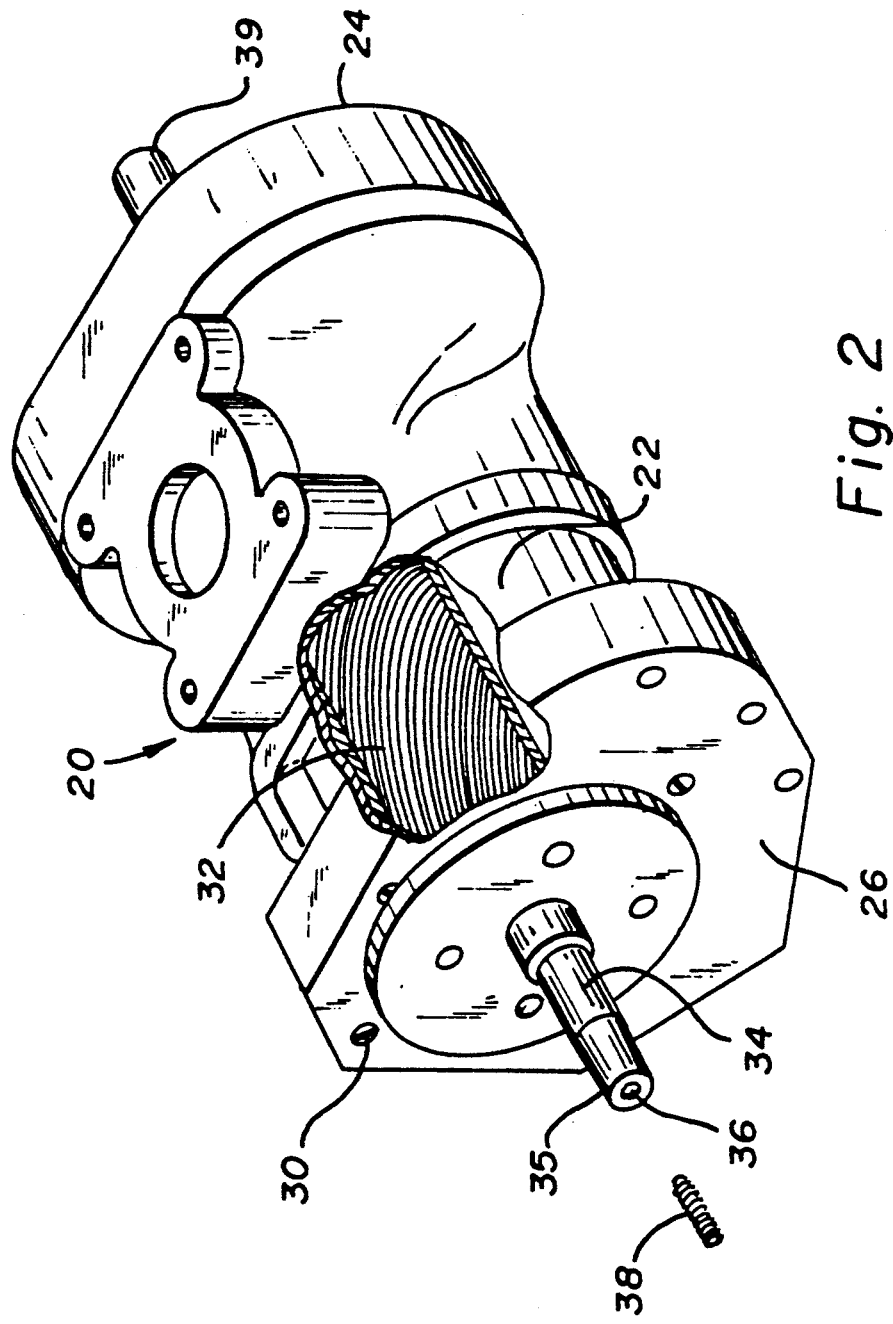
FIG. 2 is a perspective view of the compressor with a cutaway section revealing the in turned drive.
Figure 3:
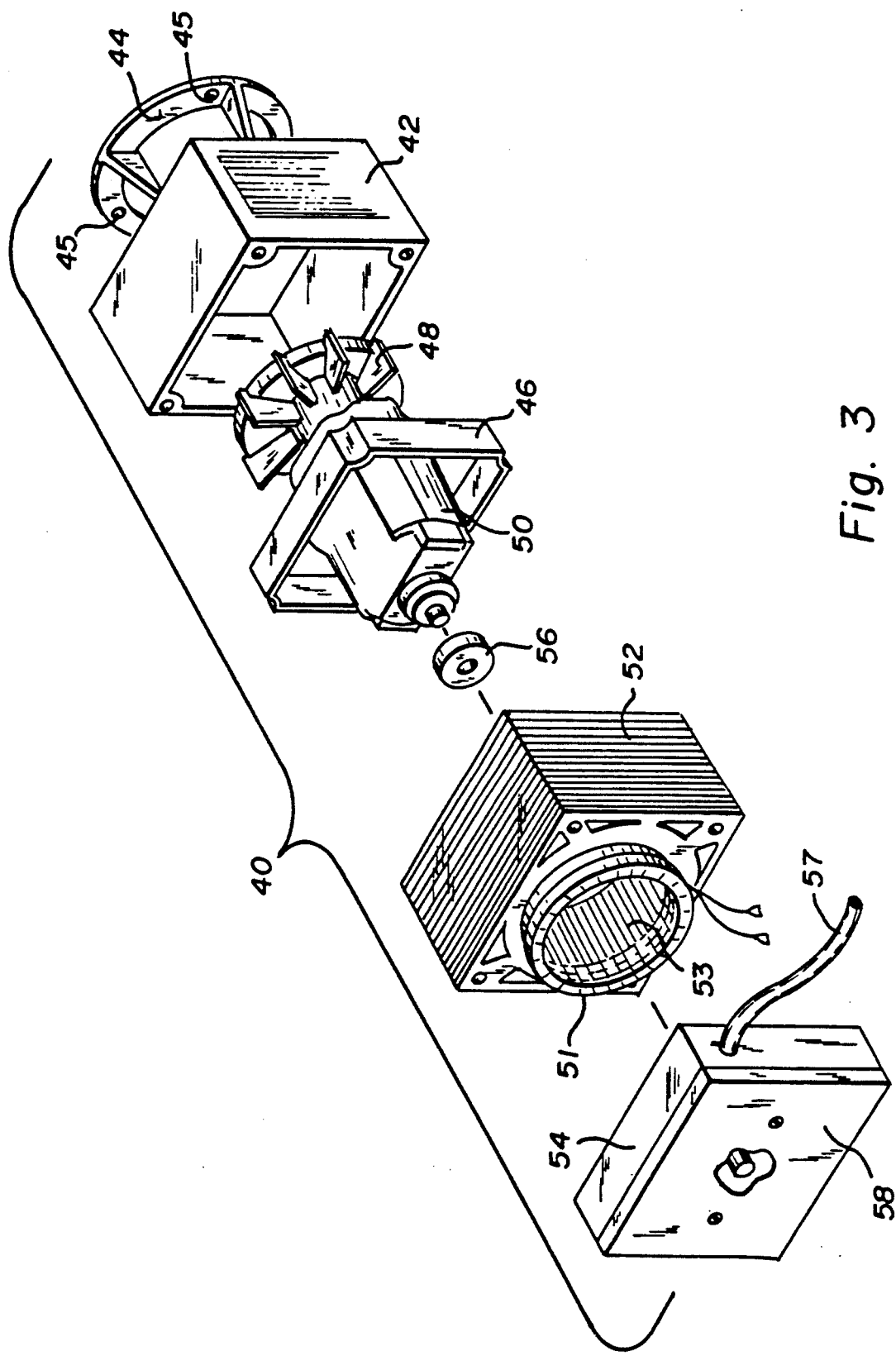
FIG. 3 is an exploded perspective view of the generator.
Figure 4:
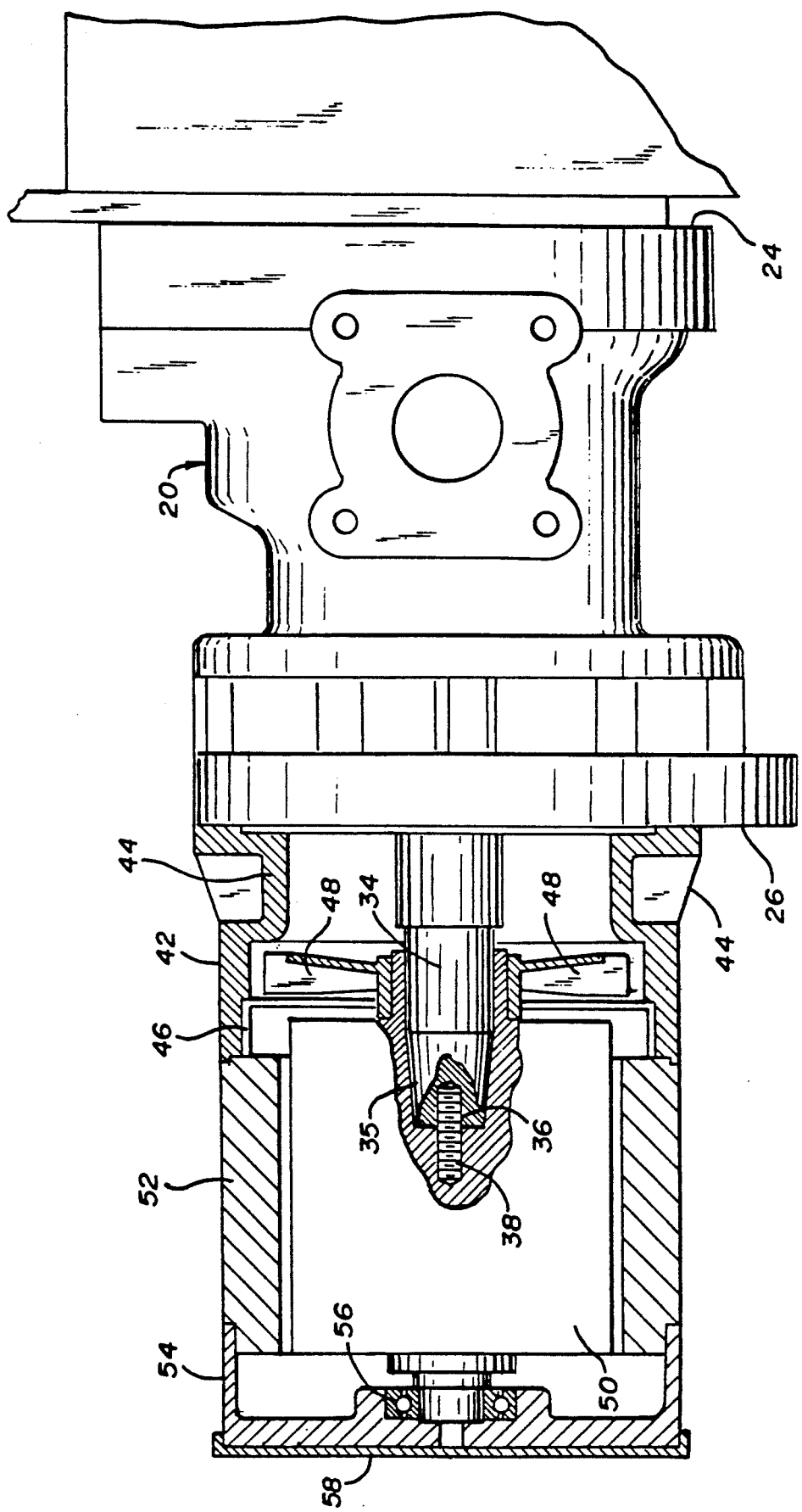
FIG. 4 is a simplified partly sectional elevational view of the compressor and generator of FIG. 1.

FIG. 1 illustrates the compressor/generator assembly 60 mounted to the output of a gearbox 10 which is driven by the motor drive 7 of a vehicle 5. FIG. 2 illustrates an air compressor 20. FIG. 3 illustrates a power generator 40. Neither compressor 20 nor generator 40 alone provide any significant patentable subject matter nor novelty to this invention. The compressor's design uses the conventional dual rotary screw compressor design. Likewise, the power generator's design follows the state of the art conventional design.

FIG. 3 shows an exploded view of the power generator 40. Bearing plate 54, stator 52, air shroud 46 and end plate 42 are in face-to-face connection forming a generally rectangular box shaped configuration. Stator 52 has a box shaped housing encasing cylindrical chamber 51 of wound copper wire 53. Generator fan 48 and connected armature 50 rotate inside air shroud 46 and stator chamber 51 on roller bearing 56 retained in bearing plate 54. Armature 50 and fan 48 rotate about a longitudinal axis inside stator 52 and air shroud 46. Rear cover plate 58 attaches to bearing plate 54. Front end plate 42 has a circular attachment 44.

The rotation of armature 50 inside stator 52 generates an electrical current. The resulting electrical current is transmitted through insulated wiring 57 exiting the bearing plate 54 to a power junction box (not shown) for conversion as a user power source. Rotation of fan 48 creates an air flow through vents in front end plate 42 and rear plate 58 which cools generator 40.

FIG. 2 shows a dual rotary screw air compressor 20. Compressor housing 22 encloses dual screw rotors 32 and other internal assembly components (not shown). Compressor housing 22 has front and rear mounting surfaces 24 and 26. Rear mount surface 26 has threaded bores 30 formed in it. Front attachment 44 of generator 40 is bolted in face-to-face relation to the rear mount surface 26 of compressor 20 by bolts extending through holes 45 in the attachment and being turned into bores 30 in the compressor surface, securing compressor 20 to generator 40. Rotor screw shaft extension 34 extends from rear mount surface 26 of compressor 20. Rotary screw shaft extension 34 has a tapered end 35 and threaded longitudinal bore 36 for accepting threaded stud 38. Rotary screw shaft extension 34 frictionally fits into a coaxial tapered bore in armature 50 of generator 40. Threaded stud 38 threads into bore 36 of rotary screw shaft extension 34 and into armature 30. The interlocked engagement of the tapered screw shaft 34 and armature 50 allows the power take-off shaft of gearbox 10 to be connected to the compressor drive or input shaft 39 to directly operate both compressor 20 and generator 40. Input shaft 39 of the compressor may be connected to other forms of power drive such as a hydraulic motor, belt drive, or, when the compressor/generator is used as a stand-alone unit, to a separate gasoline engine.

Front mounting surface 24 of compressor 20 is bolted in face-to-face relation directly to gearbox housing support 12. Support 12 carries both gearbox 10 and compressor/generator assembly 60. The support connection between the generator and compressor is accomplished by bolts extending through holes 45 in attachment 44 of the generator and being turned into threaded bores 30 in compressor surface 26.

It is understood that the above description does not limit the invention to the embodiment herein described, but that it may be modified within the scope of the appended claims.

I claim:

1. Apparatus for operationally connecting a rotary screw air compressor of the type that has an elongated housing having a front and rear and said air compressor further being of the type which has at least one rotary screw mounted between said front and rear, and said rotary screw air compressor having a shaft which projects out the front where it constitutes a input shaft (39) for operating said rotary screw air compressor, with a generator of the type having a housing having a front and rear with an armature mounted in the housing for rotation between said generator's housing's front and rear, said armature having means for engaging an extension shaft, said apparatus comprising:

a rotary screw shaft extension (34) coupled for operation by said input shaft (39), said rotary screw extension shaft (34) positioned at the rear of said compressor and projecting therefrom, said rotary screw extension shaft (34) having means for connecting it to said armature to turn said armature when received therein; and means connecting the front of said generator housing to the rear of said compressor housing with said extension shaft (34) so connected to said armature, whereby operation of said input shaft (39) of said compressor directly operates both said compressor and said generator.

2. The invention of claim 1, wherein said means for connecting said extension shaft to said armature includes a means defining a coaxial tapered bore for receiving said extension shaft and a threaded stud between said armature and said extension shaft.

3. The invention of claim 2, wherein said air compressor's housing's rear mates with said generator's housing's front and said means for connecting said housings together is a number of threaded fasteners.

* * * * *